United States Patent
Said et al.

(10) Patent No.: US 11,153,193 B2
(45) Date of Patent: Oct. 19, 2021

(54) METHOD OF AND SYSTEM FOR TESTING A COMPUTER NETWORK

(71) Applicant: SENSAI NETWORKS LTD, Haifa (IL)

(72) Inventors: Inas Said, Haifa (IL); Mohamad Badarneh, Arraba (IL); Firas Ismael, Nahif (IL); Alaa Ghanaim, Sakhnin (IL); Rami Dahmosh, Horfish (IL)

(73) Assignee: SENAI NETWORKS LTD, Haifa (IL)

( * ) Notice: Subject to any disclaimer, the term of this patent is extended or adjusted under 35 U.S.C. 154(b) by 0 days.

(21) Appl. No.: 16/356,103

(22) Filed: Mar. 18, 2019

(65) Prior Publication Data
US 2020/0304396 A1    Sep. 24, 2020

(51) Int. Cl.
*H04L 12/26*    (2006.01)
*G06N 20/00*    (2019.01)
*H04L 12/24*    (2006.01)

(52) U.S. Cl.
CPC ............. *H04L 43/50* (2013.01); *G06N 20/00* (2019.01); *H04L 41/16* (2013.01); *H04L 43/0817* (2013.01)

(58) Field of Classification Search
CPC ..... H04L 43/50; H04L 41/16; H04L 43/0817; G06N 20/00
See application file for complete search history.

(56) References Cited

U.S. PATENT DOCUMENTS

| | | | | |
|---|---|---|---|---|
| 7,028,228 | B1* | 4/2006 | Lovy | G06F 11/3495 714/47.2 |
| 8,204,713 | B2* | 6/2012 | Blick | G16H 10/40 702/179 |
| 9,648,036 | B2* | 5/2017 | Seiver | H04L 29/06585 |
| 10,162,678 | B1* | 12/2018 | Stafford | G06F 9/5077 |
| 2008/0059625 | A1* | 3/2008 | Barnett | G06F 11/3495 709/223 |
| 2010/0034247 | A1* | 2/2010 | Shaffer | H04L 47/826 375/225 |
| 2015/0347108 | A1* | 12/2015 | Munshi | G06F 8/54 717/146 |
| 2016/0242690 | A1* | 8/2016 | Principe | A61B 5/16 |
| 2017/0324488 | A1* | 11/2017 | Yi | H04W 24/04 |
| 2017/0339584 | A1* | 11/2017 | Ketonen | H04W 24/04 |

(Continued)

*Primary Examiner* — William G Trost, IV
*Assistant Examiner* — Abdelbasst Talioua
(74) *Attorney, Agent, or Firm* — Browdy and Neimark, PLLC

(57) ABSTRACT

Method of training and using a computerized system for testing a network that includes computer nodes, to determine functionality of the network, including: determining respective limit values for each of a plurality of data types; obtaining at least one sample of test data of a given data type, converting the sample value into a corresponding normalized sampled value, so that each normalized sampled value is within limit values of the given data type determined based on at least the characteristics of the given data type and the given node; combining normalized values of different types of the given node into a set of combined node features; tagging each set of combined node features with a performance tag; generating a training set that includes a plurality of tagged sets of combined features that pertain to at least one node; and inputting the training set to train the system.

24 Claims, 6 Drawing Sheets

(56) References Cited

U.S. PATENT DOCUMENTS

| | | | |
|---|---|---|---|
| 2018/0351987 A1* | 12/2018 | Patel | G06F 21/577 |
| 2019/0303759 A1* | 10/2019 | Farabet | G06K 9/4628 |
| 2020/0026538 A1* | 1/2020 | Cui | G06N 7/005 |
| 2020/0136975 A1* | 4/2020 | Arora | H04L 43/045 |
| 2020/0143240 A1* | 5/2020 | Baker | G06N 3/04 |

* cited by examiner

| | t1 | t2 | t3 | t4 | ... | t97 | t98 | t99 | t100 | Min | Max |
|---|---|---|---|---|---|---|---|---|---|---|---|
| Test ID | 3 | 3 | 3 | 3 | ... | 3 | 3 | 3 | 3 | 0 | 10 |
| Run ID | 2 | 2 | 2 | 2 | ... | 2 | 2 | 2 | 2 | 0 | 100 |
| CPU | 3 | 3 | 3 | 3 | ... | 3 | 3 | 3 | 3 | 0 | 3 |
| MEMORY | 500 | 500 | 500 | 500 | ... | 500 | 500 | 500 | 500 | 0 | 500 |
| CPU USAGE | 55 | 58 | 58 | 65 | ... | 25 | 26 | 30 | 30 | 0 | 100 |
| MEMORY USAGE | 12 | 13 | 14 | 15 | ... | 20 | 19 | 18 | 17 | 0 | 100 |
| DISK UTILIZATION | 2 | 2 | 2 | 10 | ... | 5 | 2 | 2 | 2 | 0 | 100 |
| PACKETS TX | 500 | 550 | 600 | 600 | ... | 1200 | 1250 | 1300 | 1350 | 0 | 10000 |
| PACKETS RX | 200 | 220 | 250 | 280 | ... | 500 | 500 | 500 | 500 | 0 | 10000 |
| CARRIER CHANGES | 0 | 0 | 0 | 0 | ... | 1 | 1 | 1 | 1 | 0 | 100 |
| CARRIER STATUS | 1 | 1 | 1 | 0 | ... | 0 | 1 | 1 | 1 | 0 | 1 |

FIG. 4

| | | t1 | t2 | t3 | t4 | ... | t97 | t98 | t99 | t100 | Min | Max |
|---|---|---|---|---|---|---|---|---|---|---|---|---|
| 410A | Test ID | 0.3 | 0.3 | 0.3 | 0.3 | ... | 0.3 | 0.3 | 0.3 | 0.3 | 0 | 1 |
| 410B | Run ID | 0.02 | 0.02 | 0.02 | 0.02 | ... | 0.02 | 0.02 | 0.02 | 0.02 | 0 | 1 |
| 420A | CPU | 1 | 1 | 1 | 1 | ... | 1 | 1 | 1 | 1 | 0 | 1 |
| 420B | MEMORY | 1 | 1 | 1 | 1 | ... | 1 | 1 | 1 | 1 | 0 | 1 |
| 430A | CPU USAGE | 0.55 | 0.58 | 0.58 | 0.65 | ... | 0.25 | 0.26 | 0.30 | 0.30 | 0 | 1 |
| 430B | MEMORY USAGE | 0.12 | 0.13 | 0.14 | 0.15 | ... | 0.20 | 0.19 | 0.18 | 0.17 | 0 | 1 |
| 430C | DISK UTILIZATION | 0.02 | 0.02 | 0.02 | 0.10 | ... | 0.05 | 0.02 | 0.02 | 0.02 | 0 | 1 |
| 440A | PACKETS TX | 0.050 | 0.055 | 0.060 | 0.060 | ... | 0.0120 | 0.125 | 0.130 | 0.135 | 0 | 1 |
| 440B | PACKETS RX | 0.020 | 0.022 | 0.025 | 0.028 | ... | 0.050 | 0.050 | 0.050 | 0.050 | 0 | 1 |
| 440C | CARRIER CHANGES | 0 | 0 | 0 | 0 | ... | 0.01 | 0.01 | 0.01 | 0.01 | 0 | 1 |
| 440D | CARRIER STATUS | 1 | 1 | 1 | 0 | ... | 0 | 1 | 1 | 1 | 0 | 1 |

FIG. 5

METHOD OF AND SYSTEM FOR TESTING A COMPUTER NETWORK

TECHNICAL FIELD

The presently disclosed subject matter relates to a method and system for testing the functionality of a computer network.

BACKGROUND

Computer networks are digital telecommunications networks that allow computing devices in the network, hereinafter: "computer nodes", "network nodes", or "nodes", to share resources. In computer networks, nodes exchange data with each other using connections, or "data links", between the nodes. These data links can be established over wired media, for example: wires, optic cables, etc. Data links can also be established over wireless media, for example: Wi-Fi, etc.

Nodes can originate, route, and terminate data. Nodes are typically identified by network addresses. Nodes can include hosts, for example: personal computers (PCs), phones, servers, etc. Nodes can also include networking hardware, for example: routers, switches, etc. Two nodes can be considered to be networked together when one node is able to exchange information with the other node, even if they do not have a direct connection to each other.

Computer networks can support many different applications and services, for example: access to the World Wide Web, digital video, digital audio, shared use of application and storage servers, printers, and fax machines, use of email and instant messaging applications, etc. Computer networks can differ, for example, in the transmission medium used to carry their signals, communications protocols to organize network traffic, network size, topology, traffic control mechanism and organizational intent, etc.

GENERAL DESCRIPTION

According to one aspect of the presently disclosed subject matter there is provided a computer-implemented method of training a computerized testing system to test a network that includes computer nodes, in order to determine functionality of the network, the method including:

using a computer and associated storage for performing the following:

a) determining respective limit values for each of a plurality of data types;

b) for each given computer node of at least one of the computer nodes:

1) for each given data type of at least one data type of the plurality of data types that pertain to the given node, performing at least the following:

obtaining at least one sample of test data of the given data type, the sample having a value; and converting the sample value into a corresponding normalized sampled value, so that each normalized sampled value is within the limit values of the given data type, the limit values used for the converting being determined based on at least the characteristics of the given data type and the given node;

2) combining normalized values of different types of the given node into a set of combined node features;

3) tagging each set of combined node features with a performance tag indicative of at least one status related to the network from a group of at least two different statuses;

c) generating a training set that includes a plurality of tagged sets of combined features that pertain to at least one node, wherein at least one set of features is tagged with a performance tag indicative of a first status, and at least one other set of features is tagged with a performance tag indicative of a different second status;

d) inputting the training set to train the system, until a training success criterion is met, thereby enabling the system to receive at least one set of combined node features that pertain to a corresponding tested node, and determining a performance tag indicative of at least one of the statuses, thereby determining the functionality of the network of nodes.

In addition to the above features, the method according to this aspect of the presently disclosed subject matter can include one or more of features (i) to (xviii) listed below, in any desired combination or permutation which is technically possible:

(i). wherein the plurality of data types includes at least one data type that is from one of the following categories: test configuration data related to a test characteristic of the test itself, node configuration data related to a configuration characteristic of the given computer node, performance data related to a performance characteristic of at least the given computer node, and network performance data related to a performance characteristic of the computer network.

(ii). wherein the plurality of data types in the test configuration category include at least one of the following types of data: Test Identification (ID) data, Test Name data, Run ID data, Start & End Time data, System Under Test (SUT) data, and Node Identification Number data.

(iii). wherein the plurality of data types in the node configuration category include at least one of the following types of data: Operating System (OS) Info data, Disk Related Data, CPU data, Memory data, Host Channel Adapter (HCA) data, Peripheral Component Interconnect (PCI) data, Processes data, Input and Output Disk (bytes) data, and Support Features data.

(iv). wherein the plurality of data types in the node performance category include at least one of the following types of data: CPU Usage Percentage data, Memory Usage Percentage data, Temperature of CPU data, Temperature of HCA data, and Link Detection Signals data.

(v). wherein the plurality of data types in the network performance category include at least one of the following types of data: Packets data, Dropped Packets data, Bytes data, Errors data, Multicast data, Number of Rings data, and Size of Ring data.

(vi). wherein normalizing a sample includes determining the pair of limit values including a minimum value and a maximum value for that sample based on the data type of the sample, and converting the sample value includes calculating the normalized sample value within the range of the minimum and maximum values.

(vii). wherein normalizing includes determining a pair of interim limit values for a specific data type for a specific node based on at least a characteristic of that specific node.

(viii). wherein the interim limit values of a data type for one specific node is different than the interim limit values of that same data type for another different specific node.

(ix). performing a sanity check on the normalized values.

(x). wherein the pair of limit values for normalizing are at least one of the following: 0 and 1, 1 and 2, and 0 and 100.

(xi). wherein combining includes building a matrix from the obtained test data for that node.

(xii). wherein building the matrix of the obtained test data includes determining a vector for at least one type of data based on the size of a vector for a different data type.

(xiii). wherein combining includes converting the test data into an image.

(xiv). wherein all of the data types are identical for all of the different given computer nodes.

(xv). wherein at least one status of a performance tag is either a normal status or an abnormal status.

(xvi). wherein at least one status includes one or more specification relating to the status.

(xvii). wherein the method is performed for a plurality of nodes.

(xviii). wherein training includes building a test model operational for testing a network of computers.

According to another aspect of the presently disclosed subject matter there is provided a non-transitory program storage device readable by machine, tangibly embodying a program of instructions executable by the machine to perform the above method of training a computerized testing system to test a network that includes computer nodes, in order to determine functionality of the network.

This aspect of the disclosed subject matter can optionally include one or more of features (i) to (xviii) listed above, mutatis mutandis, in any desired combination or permutation which is technically possible.

According to another aspect of the presently disclosed subject matter there is provided a computerized testing system capable of being trained for testing a network that includes computer nodes, in order to determine functionality of the network, the system including:

a computer and associated storage configured to perform the following:

a) determine respective limit values for each of a plurality of data types;

b) for each given computer node of at least one of the computer nodes:

1) for each given data type of at least one data type of the plurality of data types that pertain to the given node, perform at least the following:

obtain at least one sample of test data of the given data type, the sample having a value; and convert the sample value into a corresponding normalized sampled value, so that each normalized sampled value is within the limit values of the given data type, the limit values used for the converting being determined based on at least the characteristics of the given data type and the given node;

2) combine normalized values of different types of the given node into a set of combined node features;

3) tag each set of combined node features with a performance tag indicative of at least one status related to the network from a group of at least two different statuses;

c) generate a training set that includes a plurality of tagged sets of combined features that pertain to at least one node, wherein at least one set of features is tagged with a performance tag indicative of a first status, and at least one other set of features is tagged with a performance tag indicative of a different second status;

d) input the training set to train the system, until a training success criterion is met, thereby enabling the system to receive at least one set of combined node features that pertain to a corresponding tested node, and determine a performance tag indicative of at least one of the statuses, and thereby determine the functionality of the network of nodes.

This aspect of the disclosed subject matter can optionally include one or more of features (i) to (xviii) listed above, mutatis mutandis, in any desired combination or permutation which is technically possible.

According to another aspect of the presently disclosed subject matter there is provided a computer-implemented method of testing a network that includes computer nodes, in order to determine functionality of the network, the method including:

using a computer and associated storage for performing the following:

a) determining respective limit values for each of a plurality of data types;

b) for each given computer node of at least one of the computer nodes:

1) for each given data type of at least one data type of the plurality of data types that pertain to the given node, performing at least the following:

obtaining at least one sample of test data of the given data type, the sample having a value; and converting the sample into a corresponding normalized sampled value, so that each normalized sampled value is within the limit values of the given data type, the limit values used for the converting being determined based on at least the characteristics of the given data type and the given node;

2) combining normalized values of different types of the given node into a set of combined node features;

c) determining a performance tag indicative of a status related to the network based on the set of combined node features, thereby determining the functionality of the network of nodes.

This aspect of the disclosed subject matter can optionally include one or more of features (i) to (xviii) listed above, mutatis mutandis, in any desired combination or permutation which is technically possible.

In addition to the above features, the system according to this aspect of the presently disclosed subject matter can include one or more of features (xix) to (xxii) listed below, in any desired combination or permutation which is technically possible:

(xix). determining the performance tag in real-time.

(xx). displaying the determined performance tag on a display.

(xxi). if a performance tag with an abnormal status is determined, determining a correction related to the abnormal status.

(xxii). displaying the determined correction.

According to another aspect of the presently disclosed subject matter there is provided a non-transitory program storage device readable by machine, tangibly embodying a program of instructions executable by the machine to perform the above method of testing a network that includes computer nodes, in order to determine functionality of the network.

This aspect of the disclosed subject matter can optionally include one or more of features (i) to (xxii) listed above, mutatis mutandis, in any desired combination or permutation which is technically possible.

According to another aspect of the presently disclosed subject matter there is provided a computerized testing system for testing a network that includes computer nodes, in order to determine functionality of the network, the system including:

a computer and associated storage configured to perform the following:

a) determine respective limit values for each of a plurality of data types;

b) for each given computer node of at least one of the computer nodes:

1) for each given data type of at least one data type of the plurality of data types that pertain to the given node, perform at least the following:

obtain at least one sample of test data of the given data type, the sample having a value; and convert the sample into a corresponding normalized sampled value, so that each normalized sampled value is within the limit values of the given data type, the limit values used for the converting being determined based on at least the characteristics of the given data type and the given node;

2) combine normalized values of different types of the given node into a set of combined node features;

c) determine a performance tag indicative of a status related to the network based on the set of combined node features, and thereby determine the functionality of the network of nodes.

This aspect of the disclosed subject matter can optionally include one or more of features (i) to (xxii) listed above, mutatis mutandis, in any desired combination or permutation which is technically possible.

BRIEF DESCRIPTION OF THE DRAWINGS

In order to understand the invention and to see how it can be carried out in practice, embodiments will be described, by way of non-limiting examples, with reference to the accompanying drawings, in which:

FIG. 4 illustrates a matrix in accordance with certain examples of the presently disclosed subject matter;

FIG. 5 illustrates the matrix of FIG. 4 after normalization in accordance with certain examples of the presently disclosed subject matter;

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as, "training", "determining", "performing", "obtaining", "converting", "combining", "tagging", "generating", "inputting", "normalizing", "building", "testing", "displaying", or the like, refer to the action(s) and/or process(es) of a computer that manipulate and/or transform data into other data, said data represented as physical, such as electronic, quantities and/or said data representing the physical objects.

The term "computer" or "processor" or variations thereof should be expansively construed to cover any kind of hardware-based electronic device with data processing capabilities including, by way of non-limiting example a processing device (e.g. digital signal processor (DSP), microcontroller, field programmable circuit, application-specific integrated circuit (ASIC), etc.) or a device which comprises or is operatively connected to one or more processing devices. The terms "non-transitory memory" and "non-transitory storage medium", and "memory", used herein should be expansively construed to cover any volatile or non-volatile computer memory suitable to the presently disclosed subject matter. The above includes, by way of non-limiting example, test controller 102 which includes processor and memory 104 disclosed in the present application.

The operations in accordance with the teachings herein may be performed by a computer specially constructed for the desired purposes or by a general-purpose computer specially configured for the desired purpose by a computer program stored in a non-transitory computer-readable storage medium.

Note that all numerical values given in the examples of the description are provided for illustrative purposes only and are by no means binding.

Note that the term testing should be construed broadly to encompass also functionalities such as monitoring.

Figure 1:
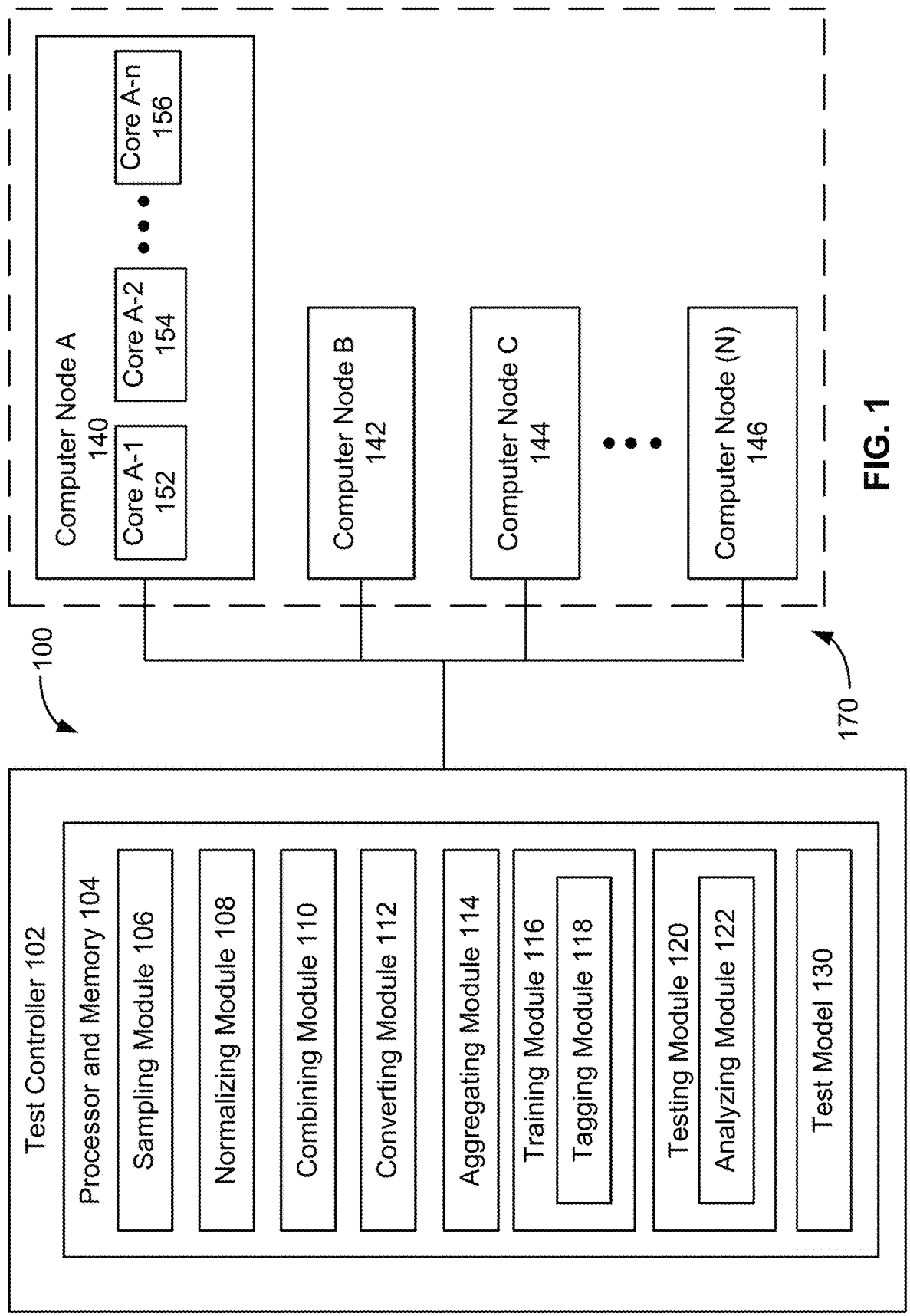
FIG. 1 illustrates a functional block diagram of a system for testing the functionality of a computer network in accordance with certain examples of the presently disclosed subject matter.

Bearing this in mind, attention is drawn to FIG. 1 illustrating a functional diagram of a testing system 100 for testing the functionality of a computer network 170 in accordance with certain examples of the presently disclosed subject matter.

It is noted that the teachings of the presently disclosed subject matter are not bound by the testing system 100 described with reference to FIG. 1. Equivalent and/or modified functionality can be consolidated or divided in another manner and can be implemented in any appropriate combination of software with firmware and/or hardware and executed on a suitable device. For example, tagging module 118 and analyzing module 122 which are shown as part of training module 116 and testing module 120, respectively, can be external modules separate from modules 116, 120. As another example, sampling module 106 is shown as part of the test controller 102, but in other examples the functionality and/or components of sampling module 106 can be distributed on one or more computer nodes 140, 142, 144, 146.

It is also noted that while the illustrated example of the testing system 100 described below includes both a training mode of operation and a testing mode of operation, that these two modes of operation can be carried out by separate systems or entities. For example, if only a training mode of operation is required then test controller 102 may not include testing module 116, and if only a testing mode of operation is required then test controller 102 may not include the training module 116.

The illustrated testing system 100 includes a test controller 102 which includes one or more processors and memory 104 configured to store data, perform processing, and execute various operations, as disclosed herein.

Test controller 102 is operatively connected to computer network 170. Computer network 170 includes a plurality of computer nodes 140, 142, 144, 146, etc. Each computer node can include a plurality of cores 152, 154, 156, etc. At least one of the computer nodes can include a program which is installed on the computer node and executed by the node sample data from the node and provide it to test controller 102.

As will be further detailed with reference to FIGS. 2-7, processor and memory 104 can be configured to execute several functional modules in accordance with computer-readable instructions implemented on a non-transitory computer-readable storage medium. Such functional modules are referred to hereinafter as comprised in the processor and memory 104. Some functions of these modules will be briefly described below, and elaborated upon further in the description of FIGS. 2-7.

For example, processor and memory 104 can include the following modules:

Sampling module 106 which can be configured to obtain data of different categories of data types from one or more nodes in the computer network. Examples of different data types are given below. In some examples, sampling module 106 can include one or more physical interfaces for sampling hardware related data of a node.

Normalizing module 108 which can be configured to normalize data obtained by the testing system 100 into normalized data.

Combining module 110 which can be configured to combine data (e.g., normalized data) into sets of combined node features. For example, the data can be combined and/or fit into a matrix of values.

Converting module 112 which can be configured to convert sets of combined node features into images. For example, the image can be a greyscale image.

Aggregating module 114 which can be configured to aggregate a plurality of sets of combined node features and/or images.

Training module 116 which can be configured to receive sets of combined node features in a training mode of operation and use them to build a test model 130 using machine learning systems.

Tagging module 118 which can be configured to tag sets of combined node features with a performance tag indicative of normal or abnormal network performance to assist the training module 116 in building the test model 130. The performance tag used for training can be determined either manually or automatically by the system.

Testing module 120 which can be configured to receive sets of combined node features in a testing mode of operation and to determine network performance.

Analyzing module 122 which can be configured to use the test model 130 and the sets of combined node features to tag the sets of combined node features with a performance tag indicative of normal or abnormal network performance. Thus, a performance tag can be determined in the testing mode of operation by using the test model 130 built using machine learning systems during the training mode of operation. In some examples, testing module 120 and/or analyzing module 122 can include one or more machine learning systems.

Figure 2:
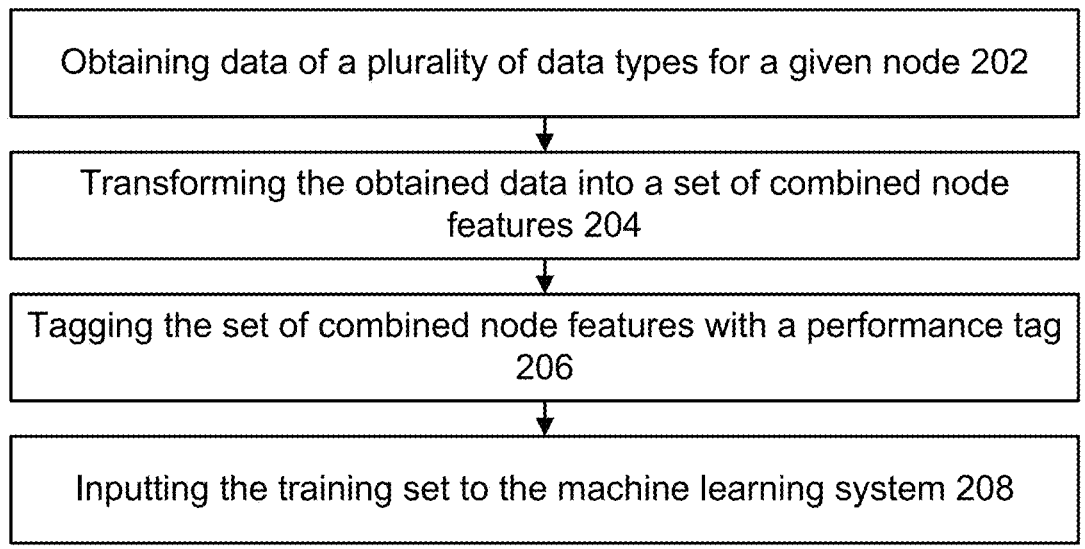
FIG. 2 illustrates a flow-chart of training the testing system in accordance with certain examples of the presently disclosed subject matter.
Figure 3:
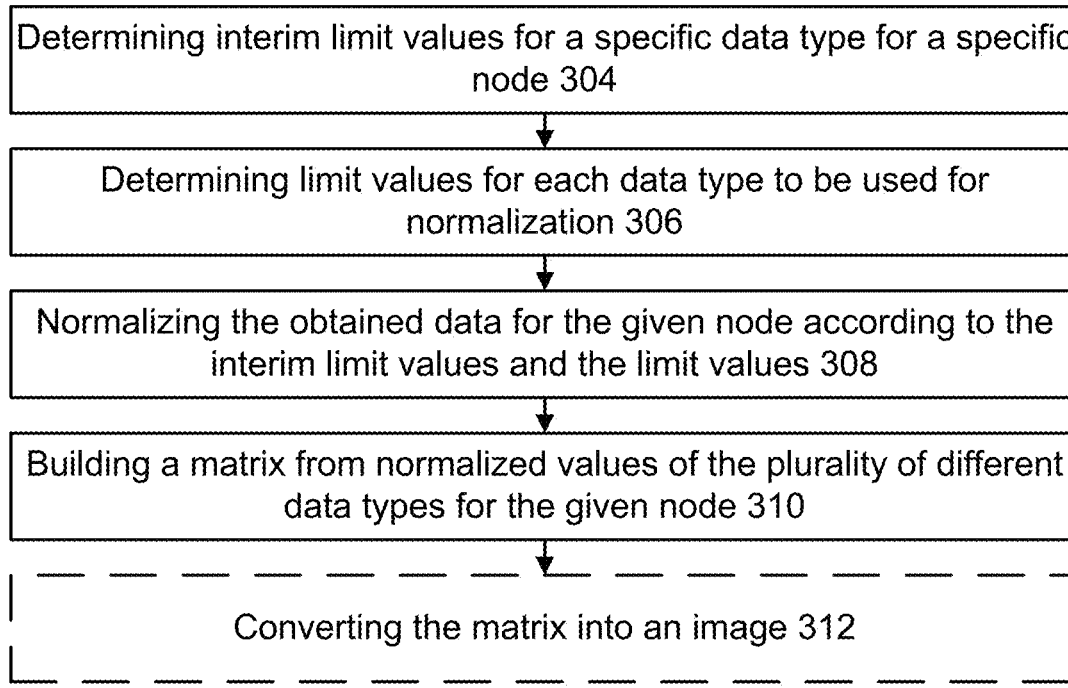
FIG. 3 illustrates a flow-chart of transforming data into a set of combined node features in accordance with certain examples of the presently disclosed subject matter.
Figure 7:
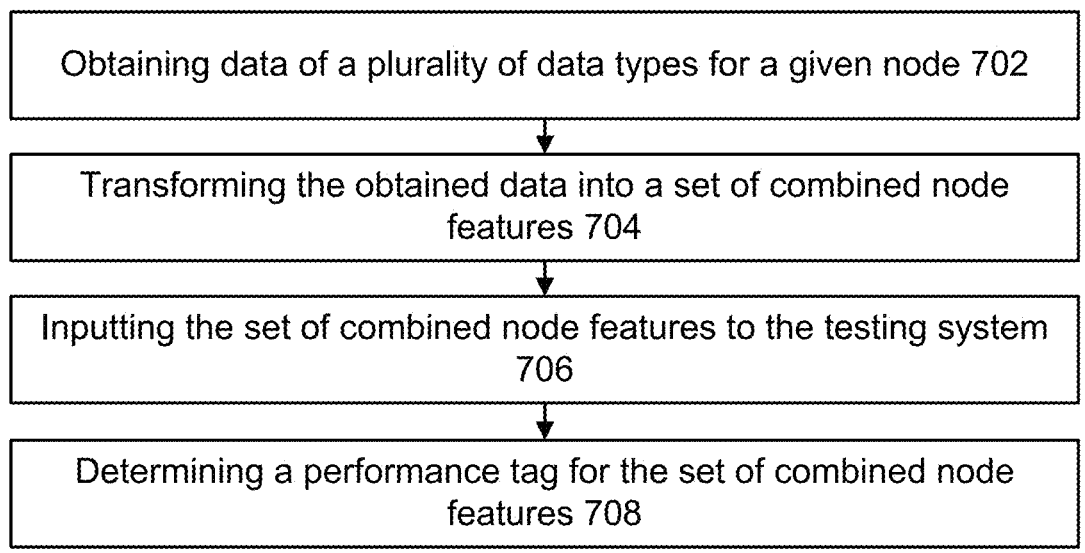
FIG. 7 illustrates a flow-chart of testing the functionality of a computer network in accordance with certain examples of the presently disclosed subject matter.

Referring to FIGS. 2-3 and 7, there are illustrated generalized flow charts of operations in accordance with certain examples of the presently disclosed subject matter.

It is noted that the teachings of the presently disclosed subject matter are not bound by the flow charts illustrated in FIGS. 2-3 and 7, the illustrated operations can occur out of the illustrated order. For example, operations 304 and 306 shown in succession can be executed substantially concurrently or in the reverse order. It is also noted that whilst the flow charts are described with reference to elements of testing system 100, this is by no means binding, and the operations can be performed by elements other than those described herein.

Referring to FIG. 2, at block 202 data values for a plurality of data types are obtained for a given node (e.g., by modules in processor and memory 104, including, for example, sampling module 106). This data can include data types from a plurality of different categories, for example: test configuration data, node configuration data, node performance data, network performance data, etc.

Data types in the category of test configuration data can include, for example: Test Identification (ID) data, Test Name data, Run ID data, Start & End Time data, System Under Test (SUT) data, Node Identification Number data, etc.

Data types in the category of node configuration data can include, for example: Operating System (OS) Info data, Disk Related Data, CPU data, Memory data, Host Channel Adapter (HCA) data, Peripheral Component Interconnect (PCI) data, Processes data, Input and Output Disk (bytes) data, Support Features data, etc.

Data types in the category of node performance data can include, for example: CPU Usage Percentage data, Memory Usage Percentage data, Temperature of CPU data, Temperature of HCA data, Link Detection Signals data, etc.

The category of network performance data can include, for example, the sub-categories of: Network Device Counters/Statistics—Receive (RX) & Transmit (TX) data, Rings—RX & TX data, etc. Data types in the sub-category of Network Device Counters/Statistics—RX & TX data, can include, for example: Packets data, Dropped Packets data, Bytes data, Errors data, Multicast data, etc. Data types in the sub-category of Rings—RX & TX data, can include, for example: Number of Rings data, Size of Ring data, etc.

The data values for a data type can be static for the duration of a test or can change dynamically during the duration of a test. In cases where the data values are dynamic the system 100 can sample values for that data type, for example, in a time series. As a further example, the data type of Test ID can have a static value that does not change for the duration of the test. On the other hand, the data type of CPU Usage can have a dynamic value that changes during the duration of the test, resulting in a series of sampled data values for that data type.

Referring to the example illustrated in FIG. 1, in order to obtain sampled data, a program can be installed and run on one or more nodes 140, 142, 144, 146 of the computer network 170 in order to gather data and provide it to the test controller 102. Values relating to one or more of the data types can be sampled from each of the given nodes 140, 142, 144, 146, and are received by test controller 102.

It should be noted that in some examples not all of the nodes in the network will have the test program run on them. Meaning the test program can be run on only a selected number of nodes in the computer network.

It should also be noted that the selected data types for the test will be the same data types for each node that is part of the test. For example, if the selected data types are: Test ID, CPU, and CPU Usage Percentage, then those will be the data types for each one of the selected tested nodes.

Referring back to FIG. 2, at block 204 the obtained test data is transformed into a set of combined node features (e.g., by modules in processor and memory 104, including, for example, normalizing module 108, combining module 110, converting module 112, and aggregating module 114). Examples of this transformation will be described in greater detail below with reference to FIG. 3. An example of a generated set of combined node features is also illustrated in matrix form in FIG. 5, and, in optional image form in FIG. 6.

At block 206 the set of combined node features is tagged (e.g., by modules in processor and memory 104, including, for example, tagging module 118).

As mentioned above, the testing system can have different modes of operation, e.g., a training mode of operation and a testing mode of operation. As an example, in the training mode the system assigns tags to sets of combined node features and uses the sets and tags as input in order to train the system and output a test model to be used for testing the system. In the testing mode the system receives sets of combined node features as input in order to output performance tags using the test model built in the training.

For example, tagging can include associating a performance tag indicative of normal or abnormal performance with the set of combined node features. As an example, in the training mode the performance tags will be provided to the machine learning system to build the test model based on the sets tagged with the normal or abnormal behavior tags. On the other hand, in testing mode, the system will determine the appropriate performance tag indicative of the performance of the network (e.g., normal or abnormal behavior), based on the provided sets of combined node features and the test model.

With further regard to the training mode of operation, for example, a run of the test can be defined as taking a certain amount of samples of data from one or more data types for each given node running the test. Each run can yield a set of combined features for the given node. In training mode a performance tag can be assigned in a computerized manner to the set of combined features. As an example, the performance tag can be indicative of a status from the group of: a normal status of functionality of the network, an abnormal status of functionality of the network, etc. By way of example, normal status and abnormal status can be defined relative to an expected performance of a characteristic of the network and/or node. As another example, a plurality of different machine learning systems are known in the art, and the definition of normal or abnormal status can be based on the machine learning system used to train the testing system.

In some examples, the performance tag can include one or more specification related to a category of the status of the performance tag. A specification can be the reason explaining why that the set of characteristics was tagged with a particular performance tag. For example, a performance tag indicative of an abnormal status can include a specification why the performance tag was determined to be indicative of abnormal status. As a further example, in the case that an abnormal status is determined based on an abnormal amount of dropped packets, then the abnormal status performance tag can include a specification to the same. Furthermore, one or more types of statuses, e.g., having similar specifications, can be grouped into a common category of status. For example, a first performance tag determined based on an abnormal Temperature of CPU and a second performance tag determined based on an abnormal Temperature of HCA can both be categorized in the same category, e.g., abnormal hardware functionality. As another example, a first performance tag determined based packet drops caused by memory load and a second performance tag determined based on packet drops caused by CPU load can both be categorized in the same category, e.g., the same common category of packet drops, even though each separate tag relates to a different specific root cause.

In some examples, a single performance tag can be indicative of a plurality of specifications (e.g., two different abnormal status specifications) and/or categories related to the status of the performance tag.

A plurality of sets of combined node features and their plurality of associated performance tags can be used to train the machine learning system, as will be described below. As an example, the training of the system done by the machine learning system can utilize the different specifications of the performance tags in order to teach the system how to identify sets of combined node features that are indicative of normal or abnormal performance and why. Thus, the training of the system can be done in part based on the different specifications, and as a result the system during testing can identify one or more different specifications based on the input sets of combined node features. In some examples, the training can be customized per the selected performance tag specifications, e.g., if sufficient examples of normal/abnormal specifications are provided to the machine learning system. As such, for example, in training mode the sets are provided tags that indicate normal or abnormal functionality of the network and why, and in testing mode sets are provided and the system determines the appropriate tags which indicate normal or abnormal functionality of the network and why.

At block 208 a training set is input to the machine learning system (e.g., by modules in processor and memory 104, including, for example, testing module 120).

In some examples, the training set can be defined as a plurality of sets of combined node features and their associated performance tags.

For example, a plurality of training test runs can be performed on a node of the network in training mode, and each run will produce a combined set of node features for that run. As mentioned above, the term "set of combined node features" will be exemplified with more detail with regard to FIG. 3 which illustrates an example of the generation of a set of combined node features. An example of a generated set of combined node features is also illustrated in matrix form in FIG. 5, and, in optional image form in FIG. 6.

In training mode, each set of combined node features will be tagged with a performance tag (e.g., normal or abnormal status, and a specification), and the sets of features and tags will be used as the training set. In some examples, the training set will include at least two performance tags having different statuses, e.g. a first normal status tag and a second abnormal status tag, or a first abnormal status tag, having a first specification defining the first abnormal status, and a second different abnormal status, having a second different specification defining the second abnormal status. As an example, a training set can include one or more sets of combined node features tagged with a performance tag that have an abnormal status with a specification related to transmitted packets, and one or more sets of combined node features tagged with a performance tag that have an abnormal status with a specification related to received packets. As another example, a training set can include one or more sets tagged with an abnormal tag with a specification related to CPU usage, and one or more sets tagged with an abnormal tag with a specification related to Memory usage. As another example, a training set can include one or more sets tagged with an a normal tag, and one or more sets tagged with an abnormal tag.

In some examples, the plurality of training test runs can be performed on a plurality of nodes of the network simultaneously. In such cases, the resulting sets of combined node features and performance tags for all of the nodes for a given run can be aggregated into a single aggregated set of combined node features and associated performance tags for all of the tested nodes for the given run (e.g., by modules in processor and memory 104, including, for example, aggregating module 114). In this example, the training set will include a plurality of aggregated sets of combined node features and the associated performance tags for all of the given nodes.

The training set can be fed to the machine learning system until a criterion for success has been met for the training. As an example, the training set can be fed to the machine learning system as a series of sets of combined node features and performance tags, one after another in succession.

The criterion for success for training can be defined as a certain threshold for success in identifying the correct performance tag for a set of combined node features by the system when given that set of combined node features. For example, successful training can be defined as a percentage of success by the system in identifying the correct performance tag of the features, e.g., 80%, 85%, 90%, etc. In other examples, other success criterion can be used, e.g., depending on the type of machine learning system used for training. A plurality of different criterion for success in machine learning systems are known in the art, and any appropriate one can be used in this regard. As an example, one or more of the following trained system evaluation metrics can be used: accuracy, precision, recall, f1-score, etc.

Training (block 208) can include building a machine learning model (e.g., test model 130) which can then be used to test the performance of the system by inputting sets of combined node features in testing mode, and outputting performance tags indicative of normal or abnormal performance related to the input sets of combined node features which will be described further below with reference to FIG. 7.

An example of the transformation of obtained test data into a set of combined node features mentioned above at block 204 is given below with reference to FIG. 3.

FIG. 3 illustrates a generalized flow-chart of a method for transforming the obtained data into a set of combined node features for a given node, in accordance with certain examples of the presently disclosed subject matter. The operations of FIG. 3 will be described with reference to the examples illustrated in FIGS. 4-6.

Before transforming, data of a plurality of data types is obtained for the given node. This step of obtaining data can be similar to that described above with reference to block 202.

Referring to FIG. 3, at block 304 a pair of interim limit values 450 are determined for a specific data type for a specific node (e.g., by normalizing module 108).

To better understand the term interim limit values, reference is made to FIG. 4.

Referring to the example of FIG. 4., a plurality of sample values are shown for a plurality of sampling times t1, t2, . . . , t100. Each sample relates to a different category of data type 410 (test configuration), 420 (node configuration), 430 (node performance), 440 (system performance). Each sample has also been fitted to a pair of interim limit values 450 for that specific data type for that specific node.

The obtained test data for the given node includes data types 410A (Test ID), 410B (Run ID), from the test configuration data category 410, data types 420A (CPU), 420B (Memory), from the node configuration data category 420, data types 430A (CPU Usage), 430B (Memory Usage), 430C (Disk Utilization) from the node performance data category 430, and data types 440A (Packets Tx), 440B (Packets Rx), 440C (Carrier Changes), 440D (Carrier Status) from the system performance data category 440.

As an example, the data type 420B of Memory has a value of say 500 since the node has a memory of say 500 GB.

In some examples, the pair of interim limits for a data type can be specific to a given node, and a first given node can have interim limits for a data type that are different than the interim limits for that exact same data type for a second given node. The interim limits for a data type for a given node can be determined based on a characteristic of that given node. In some examples, the interim limits can be determined using an algorithm. As an example, the data type of speed might need to be calculated although its limits are defined by the specific node, because it might be influenced by other components of the node (e.g., the PCI) which might result in a lower speed as a result from the calculations using the algorithm.

For example, if Node A 140 has a characteristic of say 0-5 GB for bandwidth, and Node B 142 has a characteristic of say 0-50 GB for bandwidth, then the interim limit for a related data type for Node A 140 can reflect the capabilities of that node, whereas the interim limit for a related data type for Node B 142 can reflect the different capabilities that it has. But, as will be explained below, both of these data types for different nodes with different interim limits will be normalized according to a common pair of normalization limit values that are the same for that data type for different nodes.

In the example illustrated in FIG. 4., data type 410A (Test ID) has a pair of interim limit values 450A including a minimum value 460A and a maximum value 470A. Data type, 420A (CPU) has a pair of interim limit values 450C including a minimum value 460C and a maximum value 470C. More specifically, the first data type of Test ID has a pair of interim limit values including a minimum of say 0 and a maximum of say 10, whereas the second data type of CPU has a pair of interim limit values including a minimum of say 0 and a maximum of say 3. These pairs of interim limit values can be based on the characteristics of the given node. For example, in a case where the given node has a processing speed of say 3 Ghz, therefore the related pair of interim limit values for the data type of CPU for this given node are 0 and 3. In this example, a different node might have a different processing speed of say 2 Ghz, which is reflected in the related pair of interim limit values for that specific data type for that node. Meaning, in this case the second given node can have a pair of interim limit values 450 including a minimum of say 0 and a maximum of say 2 for the CPU data type, which are different than the pair of limit values for that data type for the first node. But, as mentioned above, the transformation does not end with the different interim limits, and the values that fall within the interim limits for each different node that have a data type with different interim limits will still be fitted to the same pair of normalization limit values, as explained below with reference to FIG. 5, which shows a set of normalized values for a node. Meaning, in the example above, even though Node A has interim limit values of 0-3 for the data type of CPU, and Node B has interim limit values of 0-2 for the same data type of CPU, for both of the nodes the values of this data type will be consolidated to the same normalization limit values, e.g. 0-1, as will be explained further below.

In some examples, the data type may have an interim limit value that is not naturally quantified. For example, a data type may have a minimum limit value or maximum limit value that is infinite or naturally undefined. As an example, the data types of counters might not have a limit like the data types of transmitted packets or dropped packets counters. As another example, unavailable features on specific nodes, e.g., the data type of offloading, might return undefined value.

In such cases, a minimum limit value and/or maximum limit value having a numerical value can be determined or defined for this data type. The determined/defined interim limit value can be used for each/every given node. As mentioned above, the defining of the interim limit value can be done by an algorithm.

At block 306 a pair of limit values 550 are determined for each data type to be used for normalization (e.g., by normalizing module 108).

In some examples, the pair of limit values for normalization can be different for different data types. However, in such cases the different pair of limit values for normalization for a specific data type would be the same for each of the given nodes. For example, the pair of limit values for normalization for a data type can be determined using an algorithm. For example, the data type of maximum transmission unit (MTU) can have different limits than the data type of speed, but both have the same limits on different nodes.

The values which have been fitted to the interim limit values, as shown in FIG. 4 and described with reference to block 304, can be normalized according to the normalization limit values as shown in FIG. 5 and as will be described below with reference to block 306.

Referring to the example of FIG. 5, a plurality of normalized values are shown for a plurality of sampling times t1, t2, . . . , t100. Each sample relates to a different category of data type 410 (test configuration), 420 (node configuration), 430 (node performance), 440 (system performance), which were described with reference in FIG. 4. Each value has also been fitted to a pair of normalization limit values 550 for that specific data type.

As shown in FIG. 5, the data type 410A (Test ID) has a pair of normalization limit values 550A including a minimum value 560A and a maximum value 570A. Data type 420A (CPU) has a pair of normalization limit values 550C including a minimum value 560C and a maximum value 570C. In the illustrated example, both the first data type of Test ID and the second data type of CPU have a pair of limit values for normalization including a minimum of say 0 and a maximum of say 1. In other examples, one of these data types can have a different pair of limit values for normalization, with a different minimum value and/or maximum value. For example, the pair of limit values for normalization can be: 0 and 1, 1 and 2, 0 and 10, 1 and 10, etc. In such a case, e.g., if the data type of Test ID has a different pair of limit values for normalization including a minimum of say 1 and a maximum of say 2, then this pair of limit values for normalization would be the same for this data type for each of the other given nodes.

At block 308 the obtained test data is normalized for the given node according to the interim limit values and the limit values for normalization, or "normalization limit values" (e.g., by normalizing module 108).

The converting of values into corresponding normalized values is done for the obtained test data, so that each normalized value of the test data is within the limit values of the given data type.

Referring to FIG. 5, the sampled values have been normalized based on the pair of interim limit values 450 and the pair of normalization limit values 550 for that data type. More specifically, as an example, the sample value of the data sampled at t1 for the CPU Usage data type 430A was converted into a corresponding normalized sample value based on the interim limit values 450E of 0-100 and the normalization limit values 450E of 0-1.

More specifically, as an example, the sampled value of 55% for CPU usage for t1 which has the interim limit values of 0-100 and thus an interim value of 55, is normalized according to the normalization limit values of 0-1, which results in a normalized value of 0.55 for CPU usage at t1. As a further example, if a different node had the interim limit values of say 0-1000 for the same data type, and for example 50% was sampled for CPU usage for t1, then the interim value would be 500, then normalized according to the normalization limit values of 0-1, which results in a normalized value of 0.5 for the CPU usage for the second node at t1 in a corresponding set of values.

In some examples, a sanity check can be performed on the normalized values. For example, normalized values might be required not to be empty and limited between min and max (e.g., 0-1). As another example, other sanity checks can also be performed before and/or after the normalization process is performed. For example, checking that the data type is not empty and is of appropriate length.

At block 310 a matrix is built from the normalized values of the plurality of different types for the given node (e.g., by combining module 110).

Referring to FIG. 5, the rows of the matrix 500 are built using the normalized data values from the different data types 410A, 410B, 420A, 420B, 430A, 430B, 430C, 440A, 440B, 440C, 440D, as rows, and as a result the different columns of the matrix each relate to the same respective time period, e.g., the first column relates to t1, the second column relates to t2, . . . , the final column relates to t100. If a data type has a static value, then the static value of that data type can be used fill in the values for the length of the vector for that data value, i.e., the amount of samples taken for a different data type that has a dynamic, sampled value, which was sampled at time periods of the test. For example, the data type of Run ID has a static value of 2 (normalized value of 0.02), and this value can be used to fill out the appropriate corresponding vector/row of the matrix for this data type, which is fit to the matrix according to the length of the other vectors of the matrix, for example, determined by the amount of samples taken for the sampled test data of a different data type, e.g., 100 samples.

Figure 6:
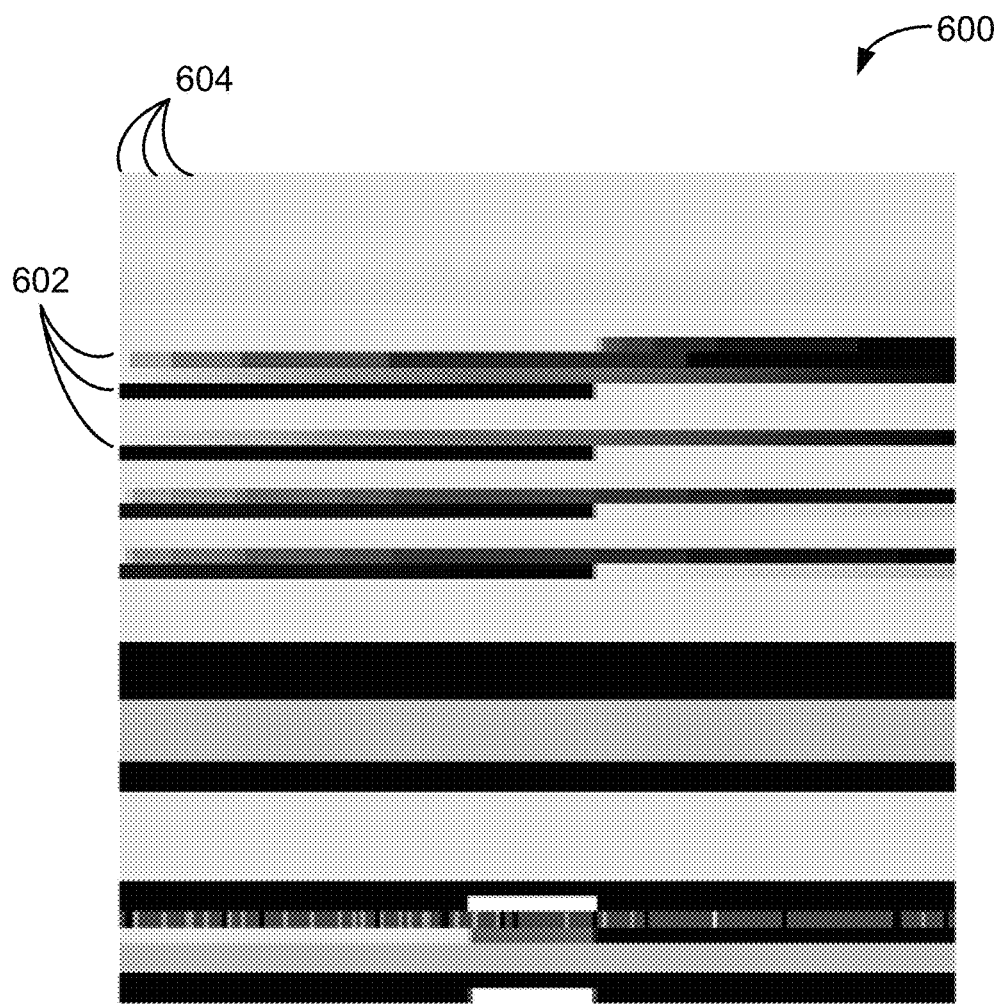
FIG. 6 illustrates a greyscale image converted from a matrix in accordance with certain examples of the presently disclosed subject matter.

Optionally, at block 312 the matrix is converted into an image (e.g., by converting module 112). Referring to FIG. 6, the rows of the matrix are represented in the image 600 as different horizontal lines 602 and the columns of the matrix are represented in the image 600 as different vertical lines 602. In cases where the matrix relates to combined sets of node features from a plurality of nodes, then the image converted from such a matrix will also relate to the plurality of nodes. In training mode, the image 600 can be used as input in the training described above with reference to block 208. In testing mode, the image can be used as input in testing which will be described below with reference to FIG. 7.

It will be appreciated that, in training mode, data from various types are obtained/sampled for one or more nodes in order to build a set of combined node features for each node. The sets of combined node features are assigned performance tags, and the sets and tags are used as a training set to train the system using machine learning, and according to a success criterion, in order to build a test model for testing the network.

In testing mode, the trained system will be used to test the network by receiving combined sets of node features and determining performance tags according to the training of the system that was performed in the training.

An example of the testing mode of operation will be explained with reference to FIG. 7.

Referring to FIG. 7, at block 702 data of a plurality of data types is obtained for a given node (e.g., by modules in processor and memory 104, including, for example, sampling module 106). This step of obtaining data can be similar to that described above with reference to block 202, and FIGS. 1-6.

At block 704 the obtained test data is transformed into a set of combined node features (e.g., by modules in processor and memory 104, including, for example, normalizing module 108, combining module 110, converting module 112, and aggregating module 114). This step of transforming can be similar to that described above with reference to block 204, and FIGS. 1-6.

At block 706 the set of combined node features is input to the testing system (e.g., by modules in processor and memory 104, including, for example, testing module 120). For example, sets of combined node features can be fed to the testing system 100 for analysis in real-time, e.g., in series one after the other. For example, if the sets of combined node features have been converted to one or more images, then the images can be fed to the testing system 100 for analysis.

At block 708 the set of combined node features is analyzed and a performance tag is determined for the set of combined node features (e.g., by modules in processor and memory 104, including, for example, analyzing module 118).

This analyzing can include using the test model 130, built from machine learning in the training of the testing system, to test the performance of the computer network 170 based on the input sets of combined node features and the test model 130.

This analyzing can also include associating a performance tag indicative of normal or abnormal performance with the set of combined node features.

The determined performance tag, or tags, can be displayed on a display.

In some examples, if a performance tag with an abnormal status is determined, then it can include one or more specifications related to the determination of the abnormal status, e.g., a category or categories related to the abnormal status. In such a case the determined category and/or specification related to the abnormal status of the performance tag can be displayed on a display.

In some examples, if a performance tag with an abnormal status is determined, then one or more possible correction related to that abnormal status can also be determined. In such a case the determined correction related to the abnormal status can be displayed on a display.

It will be appreciated that the system is trained to identify in testing mode one or more issues of functionality for one or more given nodes in the tested computer network of computer nodes. For example, if during testing a first tested node in the network is tagged with a normal performance tag, but a second node in the network is tagged with an abnormal performance tag, then this can be indicative of an issue in the functionality of the network. The determined correction can be based on the determined abnormal performance tag.

It should be noted that, as mentioned above, normal and abnormal status are only given as examples, and any appropriate number and/or types of classification can be used for training the system and testing the network using the system.

In certain examples, if a correction is determined, then the system can take one or more steps to perform that correction. For example, if the test of the network determines that one of the nodes is operating at an undesirable abnormally low speed, then the system can adjust a performance characteristic of that node, to attempt to correct its performance towards a desirable normal speed.

In some examples, the required configurations of a test can be checked before the test is performed. For example, this can be done in order to ensure the system is configured according to the required test configurations. As an example, if a required test configuration is that the flow control feature is either on or off, then this test configuration can be checked before the test is performed, and, if necessary, adjusted to the expected test configuration before beginning the test.

As can be seen from the above, the presently described subject matter is able to gather and analyze a relatively large amount of data, beyond the capabilities of a human to gather and process, and is related to an improvement in the field of computers. Additionally, the present subject matter is able to combine a variety of different types of data that are not normally combined in order to give an indication related to network performance, and improves tests of computer network performance and functionality.

Additionally, the presently described subject matter uses machine learning in order to be able to train and test the functionality of a computer network.

The present subject matter is capable of testing computer networks in real-time, and providing one or more indications regarding the performance and functionality of the computer network in real-time.

Furthermore, the present subject matter can provide a plurality of conclusions related to the functionality of the computer network. For example, the result of the test can indicate one or more possible reasons for abnormal status of the computer network, e.g., overheating CPU, cable disconnected, etc.

It will be appreciated from the above that the present subject matter can be used for system monitoring and configuration management.

The present subject matter also describes performing normalization using different interim limit values for different nodes. This allows the testing system to train and test computer networks with a plurality of nodes with diverse capabilities, for example, a computer network having both high performance/high bandwidth capability nodes, and low performance/low bandwidth capability nodes in the same computer network. This is due in part since the base line for normal/abnormal behavior can be considered differently for different nodes.

For example, in the example given above, if a first node has a characteristic of 0-5 GB for bandwidth, and a second node has a characteristic of 0-50 GB for bandwidth, then the interim limit values will be set accordingly as describe above. In such an example, if Node A when tested passes a bandwidth of 3 GB, then that will be considered 60% (or 0.6=3 GB/5 GB). If, during the same test, Node B when tested passes a bandwidth of 30 GB that will also be considered 60% (or 0.6=30 GB/50 GB).

As such, in the present subject matter, normalization of the values can be specialized based on the specific capabilities and characteristics of a given specific node that can be different than the specific capabilities and characteristics of a different given specific node in the same computer network.

This allows the system to test a computer network with a plurality of nodes with diverse capabilities in order to get an indication of network performance and functionality that takes into account the characteristics of each different specific node, while also looking at the system as a whole.

It is to be understood that the invention is not limited in its application to the details set forth in the description contained herein or illustrated in the drawings. The invention is capable of other examples and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Those skilled in the art will readily appreciate that various modifications and changes can be applied to the examples of the invention as hereinbefore described without departing from its scope, defined in and by the appended claims.

The invention claimed is:

1. A computer-implemented method of training a computerized testing system to test a network that includes computer nodes, in order to determine functionality of the network, the method comprising using a computer and associated storage for performing the following:

for each given computer node of a first computer node and a second computer node different from the first computer node, and for each given data type of a plurality of data types that pertains to said given computer node, obtaining at least one sample of test data of said given data type, the sample having a value;

determining, for a given data type pertaining to the first computer node of the network, a first pair of interim limit values usable for data normalization and including a first minimal interim value and a first maximal interim value, wherein at least one of the first minimal interim value and the first maximal interim value depends on computer hardware characteristics or computer software characteristics of the first computer node, determining, for said given data type pertaining to the second computer node of the network, a second pair of interim limit values usable for data normalization and including a second minimal interim value and a second maximal interim value, wherein at least one of the second minimal interim value and the second maximal interim value depends on computer hardware characteristics or computer software characteristics of the second computer node, wherein the first minimal interim value is different from the second minimal interim value or the first maximal interim value is different from the second maximal interim value, normalizing, for each period of time of a plurality of periods of time, a sample of the given data type pertaining to the first computer node, using the first pair of interim values, into a normalization range between a minimal normalization value and a maximal normalization value, to obtain a corresponding normalized sampled value, normalizing, for each period of time of a plurality of periods of time, a sample of the given data type pertaining to the second computer node using the second pair of interim values, into said normalization range, to obtain a corresponding normalized sampled value, for a given computer node of the first computer node and the second computer node, combining normalized sampled values of different data types of the given computer node into a set of combined node features, the set of combined features comprising a data structure or an image usable, after tagging, as input of a training of the system; tagging each set of combined node features with a performance tag indicative of at least one status related to the network of computer nodes from a group of at least two different statuses;

generating a training set that includes a plurality of tagged sets of combined node features that pertain to the given computer node, wherein at least one set of features is tagged with a performance tag indicative of a first status, and at least one other set of features is tagged with a performance tag indicative of a different second status;

inputting the training set to train the system to test a network that includes computer nodes, until a training success criterion is met, thereby enabling the system to receive at least one set of combined node features that pertain to a corresponding tested computer node, and to determine a performance tag indicative of at least one of said statuses, thereby determining the functionality of said network of computer nodes.

2. The method of claim 1, wherein the plurality of data types includes at least one data type that is from one of the following categories: test configuration data related to a test characteristic of the test itself, node configuration data related to a configuration characteristic of the given computer node, performance data related to a performance characteristic of at least the given computer node, and network performance data related to a performance characteristic of the computer network.

3. The method of claim 2, wherein the plurality of data types in the test configuration category include at least one of the following types of data: Test Identification (ID) data, Test Name data, Run ID data, Start & End Time data, System Under Test (SUT) data, and Node Identification Number data.

4. The method of claim 2, wherein the plurality of data types in the node configuration category include at least one of the following types of data: Operating System (OS) Info data, Disk Related Data, CPU data, Memory data, Host Channel Adapter (HCA) data, Peripheral Component Interconnect (PCI) data, Processes data, Input and Output Disk (bytes) data, and Support Features data.

5. The method of claim 2, wherein the plurality of data types in the node performance category include at least one of the following types of data: CPU Usage Percentage data, Memory Usage Percentage data, Temperature of CPU data, Temperature of HCA data, and Link Detection Signals data.

6. The method of claim 2, wherein the plurality of data types in the network performance category include at least one of the following types of data: Packets data, Dropped Packets data, Bytes data, Errors data, Multicast data, Number of Rings data, and Size of Ring data.

7. The method of claim 1, further comprising: performing a sanity check on the normalized values.

8. The method of claim 1, wherein:
the minimal normalization value is 0 and the maximal normalization value is 1; or
the minimal normalization value is 1 and the maximal normalization value is 2; or
the minimal normalization value is 0 and the maximal normalization value is 100.

9. The method of claim 1, wherein the data structure includes a matrix.

10. The method of claim 9, wherein building the matrix includes determining a vector for at least one type of data based on a size of a vector for a different data type.

11. The method of claim 1, wherein combining normalized sampled values of different data types for each of a plurality of computer nodes is performed using same different data types for all computer nodes of the plurality of computer nodes.

12. The method of claim 1, wherein at least one status of a performance tag is either a normal status or an abnormal status.

13. The method of claim 1, wherein at least one status includes one or more specification relating to the status.

14. The method of claim 1, wherein the method is performed for a plurality of computer nodes.

15. The method of claim 1, Wherein training includes building a test model operational for testing a network of computers.

16. A non-transitory program storage device readable by machine, tangibly embodying a program of instructions executable by the machine to perform the method of training a computerized testing system for testing a network that includes computer nodes, in order to determine functionality of the network, according to claim 1.

17. A computer-implemented method of testing a network that includes computer nodes, in order to determine functionality of the network, the method comprising:
using a computer and associated storage for performing the following:
for each given computer node of a first computer node and a second computer node different from the first computer node, for each given data type of a plurality of data types that pertains to said given computer node, obtaining at least one sample of test data of said given data type, the sample having a value;
determining, for a given data type pertaining to the first computer node of the network, a first pair of interim limit values usable for data normalization and including a first minimal interim value and a first maximal interim value, wherein at least one of the first minimal interim value and the first maximal interim value depends on computer hardware characteristics or computer software characteristics of the first computer node,
determining, for said given data type pertaining to the second computer node of the network, a second pair of interim limit values usable for data normalization and including a second minimal interim value and a second maximal interim value, wherein at least one of the second minimal interim value and the second maximal interim value depends on computer hardware characteristics or computer software characteristics of the second computer node,
wherein the first minimal interim value is different from the second minimal interim value or the first maximal interim value is different from the second maximal interim value,
normalizing, for each period of time of a plurality of periods of time, a sample of the given data type pertaining to the first computer node, using the first pair of interim values, into a normalization range between a minimal normalization value and a maximal normalization value, to obtain a corresponding normalized sampled value,
normalizing, for each period of time of a plurality of periods of time, a sample of the given data type pertaining to the second computer node using the second pair of interim values, into said normalization range, to obtain a corresponding normalized sampled value,
for a given computer node of the first computer node and the second computer node, combining normalized sampled values of different data types of the given computer node into a set of combined node features, the set of combined features comprising a data structure or an image usable, after tagging, as input of the system,
determining a performance tag indicative of a status related to the network of computer nodes based on said set of combined node features, thereby determining the functionality of said network of computer nodes.

18. The method of claim 17, further comprising determining the performance tag in real-time.

19. The method of claim 18, further comprising displaying the determined performance tag on a display.

20. The method of claim 17, further comprising, if a performance tag with an abnormal status is determined, determining a correction related to the abnormal status.

21. The method of claim 20, further comprising, displaying the determined correction.

22. A non-transitory program storage device readable by machine, tangibly embodying a program of instructions executable by the machine to perform the method of testing a network that includes computer nodes, in order to determine functionality of the network, according to claim 17.

23. A computerized testing system capable of being trained for testing a network that includes computer nodes, in order to determine functionality of the network, the system comprising:
a computer and associated storage configured to perform the following:
for each given computer node of a first computer node and a second computer node different from the first computer node, for each given data type of a plurality of data types that pertains to said given computer node, obtaining at least one sample of test data of said given data type, the sample having a value;
determining, for a given data type pertaining to the first computer node of the network, a first pair of interim limit values usable for data normalization and including a first minimal interim value and a first maximal interim value, wherein at least one of the first minimal interim value and the first maximal interim value depends on computer hardware characteristics or computer software characteristics of the first computer node, determining, for said given data type pertaining to the second computer node of the network, a second pair of interim limit values usable for data normalization and including second minimal interim value and a second maximal interim value, wherein at least one of the second minimal interim value and the second maximal interim value depends on computer hardware characteristics or computer software characteristics of the second computer node, wherein the first minimal interim value is different from the second minimal interim value or the first maximal interim value is different from the second maximal interim value, normalizing, for each period of time of a plurality of periods of time, a sample of the given data type pertaining to the first computer node, using the first pair of interim values, into a normalization range between a minimal normalization value and a maximal normalization value, to obtain a corresponding normalized sampled value, normalizing, for each period of time of a plurality of periods of time, a sample of the given data type pertaining to the second computer node using the second pair of interim values, into said normalization range, to obtain a corresponding normalized sampled value, for a given computer node of the first computer node and the second computer node, combining normalized sampled values of different data types of the given computer node into a set of combined node features, the set of combined features comprising a data structure or an image usable, after tagging, as input of a training of the system, tagging each set of combined node features with a performance tag indicative of at least one status related to the network of computer nodes from a group of at least two different statuses, generating a training set that includes a plurality of tagged sets of combined node features that pertain to the given computer node, wherein at least one set of features is tagged with a performance tag indicative of a first status, and at least one other set of features is tagged with a performance tag indicative of a different second status;

inputting the training set to train the system to test a network that includes computer nodes, until a training success criterion is net, thereby enabling the system to receive at least one set of combined node features that pertain to a corresponding tested computer node, and to determine a performance tag indicative of at least one of said statuses, thereby determining the functionality of said network of computer nodes.

24. A computerized system for testing a network that includes computer nodes, in order to determine functionality of the network, the system comprising:

a computer and associated storage configured to perform the following:

for each given computer node of a first computer node and a second computer node different from the first computer node, for each given data type of a plurality of data types that pertains to said given computer node, obtain at least one sample of test data of said given data type, the sample having a value, determine, for a given data type pertaining to the first computer node of the network, a first pair of interim limit values usable for data normalization and including a first minimal interim value and a first maximal interim value, wherein at least one of the first minimal interim value and the first maximal interim value depends on computer hardware characteristics or computer software characteristics of the first computer node, determine, for said given data type pertaining to the second computer node of the network, a second pair of interim limit values usable for data normalization and including a second minimal interim value and a second maximal interim value, wherein at least one of the second minimal interim value and the second maximal interim value depends on computer hardware characteristics or computer software characteristics of the second computer node, wherein the first minimal interim value is different from the second minimal interim value or the first maximal interim value is different from the second maximal interim value, normalize, for each period of time of a plurality of periods of time, a sample of the given data type pertaining to the first computer node using the first pair of interim values, into a normalization range between a minimal normalization value and a maximal normalization value, to obtain a corresponding normalized sampled value, normalize, for each period of time of a plurality of periods of time, a sample of the given data type pertaining to the second computer node using the second pair of interim values, into said normalization range, to obtain a corresponding normalized sampled value, for a given computer node of the first computer node and the second computer node, combine normalized sampled values of different data types of the given computer node into a set of combined node features, the set of combined features comprising a data structure or an image usable, after tagging, as input of the system, determine a performance tag indicative of a status related to the network of computer nodes based on said set of combined node features, thereby determining the functionality of said network of computer nodes.

* * * * *